US012654929B2

(12) United States Patent
Zhang et al.

(10) Patent No.: US 12,654,929 B2
(45) Date of Patent: Jun. 16, 2026

(54) ELECTRICAL CONTROL BOX FOR SUPERCONDUCTING MAGNET TRANSPORTATION AND DEVICE FOR TRANSPORTING SUPERCONDUCTING MAGNET

(71) Applicant: NINGBO JANSEN SUPERCONDUCTING TECHNOLOGIES CO., LTD., Ningbo (CN)

(72) Inventors: Qiang Zhang, Ningbo (CN); Haifeng Yao, Ningbo (CN); Xunqi Duan, Ningbo (CN); Kequan Zhao, Ningbo (CN); Weike Wang, Ningbo (CN); Wei Ding, Ningbo (CN); Jiangfeng Chen, Ningbo (CN); Hui Zhang, Ningbo (CN); Zhaoquan Liu, Ningbo (CN); Jie Zheng, Ningbo (CN); Jianyi Xu, Ningbo (CN)

(73) Assignee: NINGBO JANSEN SUPERCONDUCTING TECHNOLOGIES CO., LTD., Ningbo (CN)

( * ) Notice: Subject to any disclaimer, the term of this patent is extended or adjusted under 35 U.S.C. 154(b) by 214 days.

(21) Appl. No.: 18/699,901

(22) PCT Filed: Apr. 25, 2023

(86) PCT No.: PCT/CN2023/090557
§ 371 (c)(1),
(2) Date: Apr. 10, 2024

(87) PCT Pub. No.: WO2024/169048
PCT Pub. Date: Aug. 22, 2024

(65) Prior Publication Data
US 2025/0236454 A1 Jul. 24, 2025

(30) Foreign Application Priority Data
Feb. 17, 2023 (CN) .......................... 202310171986.8

(51) Int. Cl.
H01F 6/04 (2006.01)
B65D 88/74 (2006.01)
H02J 3/007 (2026.01)
(52) U.S. Cl.
CPC .............. B65D 88/74 (2013.01); H01F 6/04 (2013.01); H02J 3/0075 (2020.01)
(58) Field of Classification Search
CPC ......... B65D 88/74; B65D 90/004; H01F 6/04; H01F 38/14; H01R 13/665; H02J 3/381;
(Continued)

(56) References Cited

U.S. PATENT DOCUMENTS 10,574,055 B2 * 2/2020 Yang ......................... H02J 3/32
2005/0109043 A1 * 5/2005 Chan .................. G01R 33/3815
62/50.1
(Continued)

FOREIGN PATENT DOCUMENTS

CN 108657667 A 11/1976
CN 102869933 A 1/2013
(Continued)

OTHER PUBLICATIONS

International Search Report for PCT/CN2023/090557 mailed Oct. 25, 2023, ISA/CN.
(Continued)

*Primary Examiner* — John W Poos
(74) *Attorney, Agent, or Firm* — Yue (Robert) Xu; Apex Attorneys at Law, LLP

(57) ABSTRACT

An electrical control box for superconducting magnet transportation and a device for transporting a superconducting
(Continued)

magnet, relating to the field of superconducting magnet transportation, are configured to transport the cryogenic superconducting magnet. The electrical control box for superconducting magnet transportation is provided to address the problem that rated load capacity requirement of the transport apparatus is too high while transporting the superconducting magnet. A function of one input to two outputs is implemented through a power supply distribution module to supply power to a helium compressor and a refrigerator respectively to align with the common practice of transport personnel. In addition, a delay module is arranged in a power supply output connected to the helium compressor to provide power to the helium compressor later than the refrigerator, i.e., the start-up of helium compressor and the refrigerator are asynchronous.

12 Claims, 5 Drawing Sheets

(58) Field of Classification Search
CPC .. H02J 3/38; H02J 3/32; H02J 2207/20; H02J 3/46; H02J 3/388; H02J 2101/24; H02J 3/01; H02J 3/16; H02J 3/00; H02J 3/26; H02J 3/36; H02J 7/35; H02J 3/40; H02J 3/42; H02J 2101/28; H02J 3/48; H02J 9/061; H02J 2101/25; H02J 3/18; H02J 2101/10; H02J 3/44; H02J 3/50; H02J 13/00; H02J 7/865; H02J 9/06; H02J 1/102; H02J 3/007; H02J 2101/20; H02J 2101/22; H02J 3/1842; H02J 7/00; H02J 7/02; H02J 13/12; H02J 2101/00; H02J 3/14; H02J 9/062; H02J 3/00142; H02J 4/00; H02J 3/06; H02J 3/12; H02J 7/34; H02J 3/001; H02J 3/002; H02J 3/08; H02J 7/90; H02J 2105/10; H02J 3/0012; H02J 1/00; H02J 2207/40; H02J 3/1814; H02J 3/1835; H02J 3/28; H02J 7/82; H02J 9/068; H02J 13/14; H02J 15/00; H02J 3/00125; H02J 3/466; H02J 50/12; H02J 7/50; H02J 1/14; H02J 2103/30; H02J 2103/35; H02J 3/1821; H02J 3/1878; H02J 3/322; H02J 7/14; H02J 7/345; H02J 7/84; H02J 1/06; H02J 3/0014; H02J 3/1864; H02J 3/1892; H02J 7/1423; H02J 7/1446; H02J 7/61; H02J 7/63; H02J 7/96; H02J 1/002; H02J 1/10; H02J 1/108; H02J 13/36; H02J 2101/30; H02J 2105/30; H02J 2105/31; H02J 2105/33; H02J 3/0073; H02J 3/0075; H02J 3/1857; H02J 3/1885; H02J 50/10; H02J 7/06; H02J 7/1415; H02J 7/56; H02J 7/94; H02J 7/977; H02J 1/08; H02J 1/106; H02J 1/12; H02J 13/10; H02J 13/1323; H02J 13/16; H02J 2105/12; H02J 2105/51; H02J 3/003; H02J 3/008; H02J 3/04; H02J 3/1807; H02J 3/30; H02J 4/25; H02J 50/402; H02J 50/80; H02J 50/90; H02J 7/40; H02J 7/52; H02J 7/855; H02J 7/933; H02J 1/001; H02J 1/082; H02J 13/13; H02J 2105/37; H02J 2105/42; H02J 2105/52; H02J 3/02; H02J 3/10; H02J 3/1828; H02J 50/20; H02J 7/04; H02J 7/1438; H02J 7/1492; H02J 7/32; H02J 7/54; H02J 9/00; H02J 9/066; H02P 27/08; H02P 21/22; H02P 25/22; H02P 27/06; H02P 27/085; H02P 6/15; H02P 21/00; H02P 6/08; H02P 6/28; H02P 21/06; H02P 2209/07; H02P 29/0241; H02P 6/16; H02P 6/26; H02P 9/04; H02P 4/00; H02P 1/16; H02P 21/18; H02P 25/18; H02P 5/74; H02P 6/085; H02P 6/14; H02P 2201/09; H02P 6/10; H02P 101/25; H02P 23/14; H02P 29/032; H02P 9/105; H02P 29/027; H02P 29/64; H02P 5/60; H02P 6/06; H02P 21/0003; H02P 2209/01; H02P 27/12; H02P 27/14; H02P 29/68; H02P 9/48; H02P 21/05; H02P 25/20; H02P 29/40; H02P 21/12; H02P 21/14; H02P 2207/05; H02P 23/009; H02P 29/024; H02P 3/14; H02P 6/17; H02P 6/18; H02P 9/102; H02P 9/302; H02P 1/26; H02P 21/0089; H02P 21/30; H02P 2101/45; H02P 2207/01; H02P 23/26; H02P 25/089; H02P 25/092; H02P 29/028; H02P 3/18; H02P 6/12; H02P 6/182; H02P 7/28; H02P 1/04; H02P 21/20; H02P 2205/05; H02P 2209/09; H02P 23/0004; H02P 27/04; H02P 29/0016; H02P 29/02; H02P 29/50; H02P 9/007; H02P 9/307; H02P 21/0017; H02P 2103/20; H02P 2201/11; H02P 25/0925; H02P 29/60; H02P 9/006; H02P 9/305; H02P 13/06; H02P 2006/045; H02P 21/50; H02P 2101/10; H02P 2101/15; H02P 2201/07; H02P 2205/01; H02P 2207/07; H02P 23/07; H02P 25/024; H02P 25/03; H02P 25/08; H02P 25/16; H02P 27/16; H02P 29/662; H02P 5/68; H02P 6/04; H02P 6/34; H02P 7/06; H02P 9/02; H02P 1/265; H02P 1/28; H02P 21/0085; H02P 21/10; H02P 21/13; H02P 21/24; H02P 2101/30; H02P 2201/01; H02P 2201/03; H02P 2201/15; H02P 23/0077; H02P 25/022; H02P 25/026; H02P 25/086; H02P 25/184; H02P 29/0243; H02P 5/50; H02P 6/005; H02P 6/181; H02P 9/10; H02P 9/14; H02P 9/30; H02P 9/42; H02H 7/263; H02H 1/0061; H02H 3/093; H02H 3/10; H02H 7/26; H02H 1/0092; H02H 7/28; H02H 3/08; H02H 3/20; H02H 3/00; H02H 3/046; H02H 9/001; H02H 3/085; H02H 7/22; H02H 9/005; H02H 9/021; H02H 9/04; H02H 9/06; H02H 3/04; H02H 3/066; H02H 3/087; H02H 3/033; H02H 1/0007; H02H 3/042; H02H 3/16; H02H 3/207; H02H 3/24; H02H 3/26; H02H 3/338; H02H 5/105; H02H 7/262; H02H 7/268; H02H 1/0015; H02H 1/06; H02H 1/066; H02H 3/006; H02H 3/05; H02H 3/0935; H02H 3/105; H02H 5/04; H02H 5/041; H02H 7/04; H02H 7/1203; H02H 7/261; H02H 7/30; H02H 9/025

USPC ............................................... 62/53.2; 307/14
See application file for complete search history.

(56)                     References Cited

U.S. PATENT DOCUMENTS

| | | | |
|---|---|---|---|
| 2009/0266100 A1* | 10/2009 | Viegas ....................... | F25B 7/00 |
| | | | 62/113 |
| 2012/0139344 A1* | 6/2012 | Langel .................... | F03D 9/257 |
| | | | 307/64 |
| 2013/0045870 A1* | 2/2013 | Rogers ................. | B65D 88/125 |
| | | | 29/890.035 |
| 2021/0025624 A1 | 1/2021 | Li et al. | |

FOREIGN PATENT DOCUMENTS

| | | |
|---|---|---|
| CN | 207226137 U | 4/2018 |
| CN | 107994563 A | 5/2018 |
| CN | 108731339 A | 11/2018 |
| CN | 111213634 A | 6/2020 |
| CN | 112217189 A | 1/2021 |
| CN | 212992184 U | 4/2021 |
| CN | 219916829 U | 10/2023 |

OTHER PUBLICATIONS

Chinese First Office Action issued on Apr. 1, 2026 for Chinese
priority application No. 202310171986.8.

* cited by examiner

ELECTRICAL CONTROL BOX FOR SUPERCONDUCTING MAGNET TRANSPORTATION AND DEVICE FOR TRANSPORTING SUPERCONDUCTING MAGNET

This application is the national phase of International Application No. PCT/CN2023/090557, titled "ELECTRICAL CONTROL BOX FOR SUPERCONDUCTING MAGNET TRANSPORTATION AND DEVICE FOR TRANSPORTING SUPERCONDUCTING MAGNET", filed on Apr. 25, 2023, which claims priority to Chinese Patent Application No. 202310171986.8, titled "ELECTRICAL CONTROL BOX FOR SUPERCONDUCTING MAGNET TRANSPORTATION AND DEVICE FOR TRANSPORTING SUPERCONDUCTING MAGNET", filed on Feb. 17, 2023, with the China National Intellectual Property Administration, which is incorporated herein by reference in their entireties.

FIELD

The present disclosure relates to the field of superconducting magnet transportation, and in particular to an electrical control box for superconducting magnet transportation and a device for transporting a superconducting magnet.

BACKGROUND

In conventional technology, there are three transportation methods for transporting superconducting magnets, i.e., sea transportation, land transportation and air transportation. Where, sea transportation and land transportation are more common. To reduce the cost for customers using the superconducting magnets, transporting cryogenic superconducting magnets is a better transportation solution for now. For the transportation of cryogenic superconducting magnets, it is required to introduce liquid helium into the superconducting magnet through a helium compressor to maintain the ultra-low temperature required by the magnet and to keep the internal coils in a superconducting state.

Currently, to facilitate the transportation of cryogenic superconducting magnets, a helium compressor and a refrigeration apparatus are at least required. Accordingly, for a sealed environment used in transporting cryogenic superconducting magnets, there is a need for at least one power supply to provide power to the helium compressor and refrigeration apparatus. Based on the common practice of transportation personnel, a conventional approach is to run a single power cable from outside the sealed environment to connect to an external power supply source, along with two power cables from the inside to power the helium compressor and refrigeration apparatus. This configuration is referred to as a "one input and two outputs" power connection mode. However, due to the instant starting current of the helium compressor and the refrigeration apparatus during start-up is often five to seven times higher than the current in the smooth operation, it is beyond the rated load capacity of the power supply outlets of some trucks or ships. This may result in a dilemma that one of the helium compressor or the refrigeration apparatus fails to start normally. Consequently, the transportation of cryogenic superconducting magnets imposes higher demands on the rated load capacity of the power supply of the transportation apparatus, which is not conducive to practical transportation.

Therefore, those skilled in the art in the field urgently require an electrical control box for the transportation of superconducting magnets to address the problem that the rated load capacity demand of the transport apparatus is excessively high when transporting the superconducting magnets.

SUMMARY

An objective of the present disclosure is providing an electrical control box for superconducting magnet transportation and a device for transporting a superconducting magnet, to address the problem that the rated load capacity demand of the transport apparatus is excessively high when transporting the superconducting magnets.

In order to solve the above technical problems, an electrical control box for superconducting magnet transportation is provided according to the present disclosure, including at least three power supply outlets, a power supply distribution module, and a delay module, where:

among the at least three power supply outlets, a first power supply outlet is configured to be connected to an external power supply, a second power supply outlet is configured to be connected to a refrigerator, and a third power supply outlet is configured to be connected to a helium compressor;

the power supply distribution module is connected to the first power supply outlet, the second power supply outlet and the third power supply outlet respectively, and configured to divide electric energy inputted from the first power supply outlet into two branches to supply to the second power supply outlet and the third power supply outlet;

the delay module is arranged between the power supply distribution module and the third power supply outlet, which is configured to delay powering on the third power supply outlet.

In an embodiment, the electrical control box for superconducting magnet transportation further includes a phase sequence conversion module and a phase sequence detection module;

the phase sequence conversion module is connected to the power supply distribution module and the delay module, where the phase sequence conversion module includes two alternating current contactors, the two alternating current contactors are connected to the delay module in a sequential connection and in a changed phase sequence connection respectively, the two alternating current contactors are connected to the phase sequence detection module, and turn-on state and turn-off state of the two alternating current contactors are controlled by the phase sequence detection module; and the phase sequence detection module is connected to the power supply distribution module, which is configured to detect a phase sequence of power supply outputted by the power supply distribution module and control the two alternating current contactors in the phase sequence conversion module to be turned on or off, based on the phase sequence of power supply.

In an embodiment, the electrical control box for superconducting magnet transportation further includes: a voltage gear switching module and a voltage detection module;

the voltage gear switching module is arranged between the power supply distribution module and the helium compressor, including multiple sets of jumpers and a selection device; where each set of multiple sets of jumpers is connected to the helium compressor and the power supply distribution module respectively, corresponding to different voltage levels. The selection device is configured to control each of the multiple sets of jumpers to be turned on or off; and the voltage detection module is connected to the power supply distribution module and the selection device, which is configured to detect an output voltage of the power supply distribution module and return a result to the selection device.

In order to solve the technical problems above, a device for transporting a superconducting magnet is provided according to the present disclosure, including the above electrical control box for superconducting magnet transportation, a container with a thermal insulation layer, a refrigerator, a helium compressor, a suspension structure;

where, the electrical control box for superconducting magnet transportation is arranged on an inner sidewall of the container and connected to the helium compressor, the refrigerator and the external power supply through power supply cables respectively;

the refrigerator is arranged in the container to adjust temperature in the container;

the suspension structure is secured on top of the inner wall of the container; and the helium compressor is kept suspended in the container by the suspension structure.

In an embodiment, the suspension structure includes: a fixing frame, an outer frame and an inner frame; where, the fixing frame is secured on the top of the inner wall of the container, and the outer frame is hinged under the fixing frame, and the inner frame is hinged on the outer frame for installing the helium compressor, and a rotating axis of the inner frame intersects with the rotating axis of the outer frame, and the two rotating axes are located on the same horizontal plane as the center of gravity of the helium compressor.

In an embodiment, the suspension structure further includes: a curved outlet plate arranged at a helium tube interface of the helium compressor; where, an end of the curved outlet plate is secured on the inner frame, which is configured to secure the helium tube drawn from the helium compressor.

In an embodiment, the suspension structure further includes a flexible hook arranged at the fixing frame, which is configured to hang the helium tube.

In an embodiment, the device for transporting the superconducting magnet further includes: a drag chain arranged on an outer surface of the helium tube.

In an embodiment, the device for transporting the superconducting magnet further includes a cushioning and shock-absorbing structure arranged between a bottom plate of the container body and the superconducting magnet.

In an embodiment, the device for transporting the superconducting magnet further includes: a superconducting magnet state monitor arranged at the superconducting magnet; correspondingly, the electrical control box for superconducting magnet transportation further includes a power supply outlet configured to be connected to the superconducting magnet state monitor; and a communication module is further arranged outside the container, which is configured to communicate between the superconducting magnet state monitor and an external device, and the communication module is connected to the superconducting magnet state monitor through a cable.

The electrical control box for superconducting magnet transportation provided in the present disclosure, has a function of one input to two outputs through the power supply distribution module, to implement one power supply input and two power supply outputs to supply the helium compressor and the refrigerator respectively while complying with the common practice of transport personnel where the container is usually only connect to one external power cable. Further, according to the present disclosure, a delay module is arranged in a separated power supply output connected to the helium compressor to provide power to the helium compressor later than the refrigerator, that is, the helium compressor and the refrigerator are started asynchronously, so as to eliminate the problem that the two devices cannot start normally due to the starting current of the two devices exceeds the load capacity of the external power supply. As a result, in the cryogenic superconducting magnet transportation, the helium compressor can maintain an electrification state for a long period to ensure that the liquid helium of the magnet is non-volatile, which meets the transportation requirement of the cryogenic superconducting magnet.

The effects of the device for transporting a superconducting magnet provided in the present disclosure are corresponding to the effects of the above electrical control box for superconducting magnet transportation.

BRIEF DESCRIPTION OF THE DRAWINGS

In order to more clearly describe the embodiments of the present disclosure, the drawings required to illustrate the embodiments are briefly described hereinafter. It is apparent that the drawings described below merely illustrate some embodiments of the present disclosure, and those skilled in the art may obtain other drawings based on the provided drawings without any creative effort.

Figure 1:
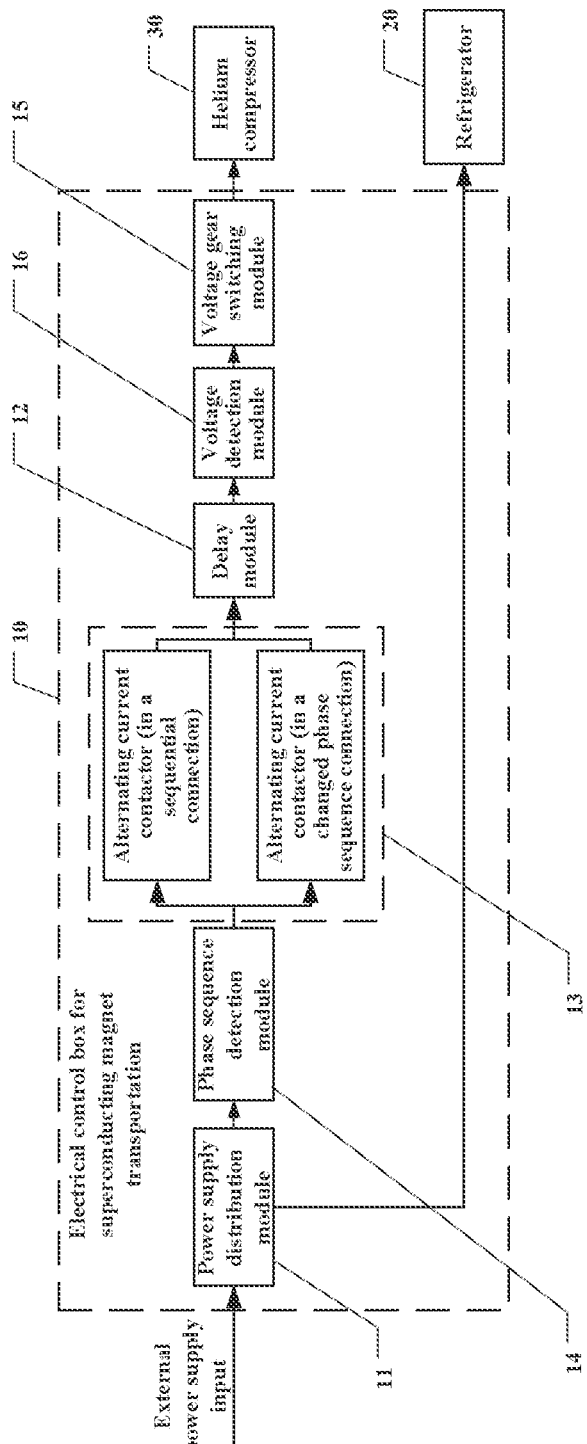
FIG. 1 is a structural schematic diagram of an electrical control box for superconducting magnet transportation according to an embodiment of the present disclosure.

where, 10 represents an electrical control box for superconducting magnet transportation, 11 represents a power supply distribution module, 12 represents a delay module, 13 represents a phase sequence conversion module, 14 represents a phase sequence detection module, 15 represents a voltage gear switching module, 16 represents a voltage detection module, 20 represents a refrigerator, 30 represents a helium compressor, 31 represents a helium tube, 311 represents a stainless steel hard tube, 312 represents a metal corrugated flexible tube, 32 represents a helium tube nut, 40 represents a container with an thermal insulation layer, 41 represents a cushioning and shock-absorbing structure, 50 represents a suspension structure, 51 represents a fixing frame, 52 represents an outer frame, 53 represents an inner frame, 54 represents a rotating axis of the inner frame, 55 represents a rotating axis of the outer frame, 56 represents a curved outlet plate, 57 represents a flexible hook and 60 represents a superconducting magnet.

DETAILED DESCRIPTION OF THE EMBODIMENTS

Technical solutions of embodiments of the present disclosure are described clearly and thoroughly below in conjunction with the drawings of the embodiments of the present disclosure. Apparently, the embodiments described below are only some rather than all the embodiments of the present disclosure. Any other embodiments obtained by those ordinary skilled in the art based on the embodiments in the present disclosure without any creative effort fall within the protection scope of the present disclosure.

The core of the present disclosure is providing an electrical control box for superconducting magnet transportation and a device for transporting a superconducting magnet.

In order to make those skilled in the art have a better understanding of solutions of the present disclosure, the present disclosure is described in further detail hereinafter, in conjunction with the drawings and embodiments.

A device based on superconducting magnetic resonance medical imaging is a crucial and large-scale advanced diagnostic device in modern medicine. Nevertheless, its technical complexity and high level of difficulty limit its manufacturing to only a few countries and regions. Given the significance of this device in medical diagnosis, many countries and regions have a demand for it. In the global market, the primary challenge is the international transportation of the superconducting magnet, a core component of the device based on superconducting magnetic resonance medical imaging.

The superconducting magnet is usually filled with liquid helium inside at the factory, and this state of the superconducting magnet is commonly referred to as a cryogenic superconducting magnet in the industry. The liquid helium is a key factor to maintain the ultra-low temperature environment of the magnet so as to maintain the superconducting state of internal coils. In storage or operation, it is necessary to keep liquid helium non-volatile. Conventional superconducting magnet insulation technology is relatively mature. As long as the helium compressor of the superconducting magnet is supplied with power to maintain operational status, the liquid helium remains non-volatile. In indoor environments, the power supply infrastructure is well-established, and providing power to the magnet helium compressor is typically not an issue. However, during transportation, creating a stable power supply condition and maintaining the necessary temperature and humidity levels for the cold head compression to operate normally can be challenging.

In order to solve the above problems in the cryogenic superconducting magnet transportation, the following conditions are required be met: 1. providing stable power supply, where power and current meets requirements of the refrigeration device of the cryogenic magnet; 2. always keeping the helium compressor in the refrigeration device approaching or being a horizontal state to prevent oil and gas from mixing inside the helium compressor, which would result in a loss of refrigeration efficiency for the magnet; 3. maintaining a temperature and humidity environment for a reliable operation of the refrigeration device to eliminating overheating, undercooling or salt corrosion.

Currently, the above conditions are primarily achieved by arranged a sealed container with a temperature adjustment apparatus (usually a refrigerator). The sealed container is configured to insulate from external environment influences, while the temperature adjustment apparatus is configured to control a temperature within the sealed container to ensure that the liquid helium does not volatilize. Further, to align with the standard operation of refrigerated containers that the operators are familiar with, a single power supply input is usually utilized for the container. Two power supply outputs are then extended through a power supply distribution apparatus to provide power to both helium compressor and the refrigerator of the magnet. This setup simplifies power management, as the operators only need to oversee one power cable to ensure the power supply of the container.

However, a new challenge arises: some container trucks and container ships have limited rated load capacities for their power outlets, making it impossible to supply power to both the helium compressor and the refrigerator simultaneously. Additionally, the helium compressor and refrigerator are inductive loads, both resulting in the instant starting current surge during start-up. This surge in instant starting current is five to seven times higher than the normal smooth operating current. When both devices attempt to start simultaneously, the superposed instant current exceeds the rated load capacity of the power supply outlets of some container trucks or ships. This leads to a failure to start devices, thereby compromising the conditions for transporting superconducting magnets and causing transportation failures. Nevertheless, the selection of cold chain container trucks and ships with higher-rated output currents may lead to unnecessary costs, implementation challenges and longer timelines, which can compromise the practical implementation of cryogenic superconducting magnet transportation.

For problems above, an electrical control box 10 for superconducting magnet transportation is provided according to the present disclosure, as shown in FIG. 1. The electrical control box 10 for superconducting magnet transportation includes at least three power supply outlets, a power supply distribution module 11 and a delay module 12.

For the power supply outlets, a first power supply outlet is configured to be connected to an external power supply, a second power supply outlet is configured to be connected to a refrigerator 20, and a third power supply outlet is configured to be connected to a helium compressor 30.

The power supply distribution module 11 is connected to the first power supply outlet, the second power supply outlet and the third power supply outlet respectively, and is configured to divide electric energy inputted from the first power supply outlet into two branches to supply to the second power supply outlet and the third power supply outlet.

The delay module 12 is arranged between the power supply distribution module 11 and the third power supply outlet, configured to delay powering on the third power supply outlet.

In this embodiment, a power supply with one input and two outputs provided through at least three power supply outlets to meet the behavior and the habits of the operators for cold chain container management and to meet the power supply requirements of the refrigerator 20 and the helium compressor 30. One external power supply input is divided into two branches through the power supply distribution module 11, one branch supplies power to the refrigerator 20, and another supplies power to the helium compressor 30. Where, the power supply for the helium compressor 30 is delayed through the delay module 12, to achieve asynchronous start-up of the refrigerator 20 and the helium compressor 30. This helps reduce the synchronous start-up load on the power output of container trucks or ships, thereby improving the reliability of cryogenic superconducting magnet transportation and reducing the requirements on transport vehicles.

It should be noted that, according to the present disclosure, the asynchronous start-up of the refrigerator 20 and helium compressor 30 is implemented through the delay module 12, to avoid the high load requirements of the instant starting current on the power supply. In an embodiment, the delay module 12, whether is used to delay the start-up of the refrigerator 20 or the helium compressor 30, can enable the asynchronous start-up. However, for the transportation process of the cryogenic superconducting magnet, ensuring the non-volatilization of liquid helium is an essential condition of performing cryogenic superconducting magnet transportation, which has certain requirements on the temperature conditions in the refrigerated container. Hence, according to the present embodiment, the refrigerator 20 is first started to ensure the temperature conditions in the container, and then the helium compressor 30 is started to meet the liquid helium refrigeration requirements of the cryogenic superconducting magnet, which is a preferable implementation solution.

It should further be noted that a delay period for achieving the asynchronous start-up is not limited in the present embodiment. The delay period should be determined according to the start time of the first started device. After the current of the first started device is stable and normal, the start of the latter device is performed. The period waiting for the current of the first started device to be stable is the delay period. In this embodiment, the setting of the delay period shall be determined according to the start time of the refrigerator 20, usually being set as a period of 3 minutes to 5 minutes.

Further, in a case that the transportations of the cryogenic superconducting magnet have different transport destination countries or regions, the power supplies of different countries or regions are not necessarily the same. In terms of the transportation, the three-phase alternating current of the port site, container trucks or ships may have different phase sequences and different voltages, which challenges the stable power supply during the transportation process of the cryogenic superconducting magnet.

For the challenges above, preferable implementations are provided to overcome the challenges. In an embodiment, as shown in FIG. 1, the electrical control box 10 for superconducting magnet transportation further includes: a phase sequence conversion module 13 and a phase sequence detection module 14.

The phase sequence conversion module 13 is connected to the power supply distribution module 11 and the delay module 12, including two alternating current contactors, the two alternating current contactors are connected to the delay module 12 in a sequential connection and a changed phase sequence connection respectively. The two alternating current contactors are further connected to the phase sequence detection module 14, and turn-on state and turn-off state are controlled by the phase sequence detection module 14.

The phase sequence detection module 14 is connected to the power supply distribution module 11, configured to detect a phase sequence of power supply outputted by the power supply distribution module 11 and control the two alternating current contactors in the phase sequence conversion module 13 to be turned on or off, based on the phase sequence of power supply.

It should be understood that there are two types of phase sequence of three-phase alternating current, i.e., a positive sequence (e.g., A to B to C, etc.) and a negative sequence (e.g., C to B to A, etc.). At present, the common switching methods for the phase sequence of three-phase alternating current are implemented by a two-direction switch and an alternating current contactor. According to this embodiment, the alternating current contactor is preferred to be used. An alternating current contactor set in a sequential connection and an alternating current contactor set in a changed phase sequence connection are configured to control whether to change the phase sequence of the three-phase alternating current. When the three-phase alternating current of the external power supply is connected, the phase sequence detection module 14 detects whether the phase sequence of the three-phase alternating current currently connected is consistent with the phase sequence of the three-phase alternating current required by the helium compressor 30. In a case that the phase sequence of the three-phase alternating current currently connected is consistent with the phase sequence of the three-phase alternating current required by the helium compressor 30, the alternating current contactor in the sequential connection is controlled to be turned on and the alternating current contactor in the changed phase sequence connection is turned off, i.e., no phase sequence switching operation is performed on the three-phase alternating current inputted from the external power supply, the current is normally outputted to the helium compressor 30. In a case that the phase sequence of the three-phase alternating current currently connected is inconsistent with the phase sequence of the three-phase alternating current required by the helium compressor 30, the alternating current contactor in the sequential connection is turned off and the alternating current contactor in the changed phase sequence connection is turned on, i.e., the phase sequence of the external input three-phase alternating current is changed to meet the phase sequence requirements of the helium compressor 30.

In the above embodiment, since that the delay module 12 required to be arranged in a power supply output of the helium compressor 30 to implement asynchronous start-up, both alternating current contactors should be arranged with a delay module 12 according to this embodiment. One delay module 12 or two independent delay modules 12 may be arranged to ensure the asynchronous start-up of the helium compressor 30 and the refrigerator 20 regardless of whether the phase sequence changing operation is performed. In addition, for the phase sequence switching of refrigerator 20, if necessary, the phase sequence changing of the three-phase alternating current may be controlled by two alternating current contactors in the sequential connection and the changed phase sequence connection respectively, as described in the above embodiments, which will not be repeated herein.

In addition, another preferable implementation is provided according to an embodiment to solve the problem of different supply voltages in different countries or regions. As shown in FIG. 1, the electrical control box 10 for the superconducting magnet transportation described above further includes: a voltage gear switching module 15 and a voltage detection module 16.

The voltage gear switching module 15 is arranged between the power supply distribution module 11 and the helium compressor 30. In an embodiment, as shown in FIG. 1, the voltage gear switching module 15 is arranged on the output branch of the power supply distribution module 11 to the helium compressor 30, i.e., between the delay module 12 and the helium compressor 30. The voltage gear switching module 15 includes multiple sets of jumpers and a selection device. Where, each set of jumpers is connected to the helium compressor 30 and the power supply distribution module 11 respectively, corresponding to different voltage levels. The selection device is configured to control each of the multiple sets of jumpers to be turned on or off.

The voltage detection module 16 is connected to the power supply distribution module 11 and the selection device, similar to the voltage gear switching module 15, the voltage detection module 16 is arranged between the delay module 12 and the helium compressor 30, which is config- ured to detect output voltage of the power supply distribu- tion module 11 and return a result to the selection device.

Since the voltages of the power girds of different countries and regions vary, it is required to be change the correspond- ing power supply adapter for the external power supply input of refrigerated containers to accommodate to different voltage levels. In conventional technology, the correspond- ing power supply adapter is manually changed through jumpers. For example, when the external power gird in China is connected as the power supply input, the transport personnel have to open and enter the container to control the helium compressor 30 and other devices to jump to 380V gear. In United States, it is required to jump to 480V gear for plugging in (i.e., connecting to external power). During the actual transportation process of the cryogenic superconduct- ing magnet, containers are usually not allowed to open. As a result, the manual process of switching voltage gears through jumpers leads to significant management and trans- portation costs.

According to this embodiment, the electrical control box 10 of the power supply in the container is controlled. The voltage detection module 16 detects the voltage gear of the external power supply input that is currently connected. Further, multiple sets of jumpers adapted to the requirements of different countries and regions are set in advance, and a set of jumpers of the corresponding gear is turned on through the voltage gear switching device, to enable the automatic switching of the voltage gear without manual operation. Therefore, there is no need to open the refrigerated con- tainer, which is conducive to controlling the temperature in the container, reducing transportation cost and improving transportation efficiency.

It should be noted that, for the control requirement of the selection device, according to this embodiment, one of the multiple sets of jumpers is controlled to be turned on, i.e., the turn-on requirement for selecting one from multiple. The selection device may be implemented by a device such as a multiplexer. The quantity of the multiple sets of jumpers, from which the one set is selected, is determined according to the preset voltage gear of the jumper. According to how many countries or regions that the cryogenic superconduct- ing magnet will pass through during the transportation process, and how many different voltage gears in these countries or regions, the corresponding quantity of sets of jumpers is pre-configured, and the selection device may also be determined according to the quantity of sets of jumpers.

With the electrical control box 10 for superconducting magnet transportation, as provided in this embodiment, the power supply distribution module 11 can enable one external power supply input and two power supply outputs. This aligns with the common practice of providing power to the container for maintenance purposes by transportation per- sonnel, thus eliminating power losses of the essential devices in the cryogenic superconducting magnet transpor- tation that would occur, if the power supply were unplugged. As a result, the reliability of the cryogenic superconducting magnet transportation is enhanced. Furthermore, in this embodiment, the asynchronous start-up of the refrigerator 20 and the helium compressor 30 is achieved through the delay module 12. This eliminates start-up failures in these devices caused by the substantial instant starting current surge when both devices are started simultaneously, which would otherwise exceed the load capacity of the power supply of the container. Consequently, the reliability during the transportation of cryogenic superconducting magnets is further improved. Additionally, this approach reduces the demand for power load capacity on the transportation carrier (such as a container truck or ship) and lowers transportation costs. Moreover, in this embodiment, the phase sequence switching control of the external input three-phase alternat- ing current is achieved by detecting the phase sequence of the external input power supply and configuring the alter- nating current contactor in the sequential connection as well as the alternating current contactor in the changed phase sequence connection, which accommodates the varying phase sequences in different countries or regions and con- tributes to enhancing the stability of the power supply during the transportation of cryogenic superconducting magnets. Finally, the voltage detection module 16 and the voltage gear switching module 15 are also configured to facilitate auto- matic switching of the power supply for the helium com- pressor 30 and other devices when the external power supply voltage is in a different gear. This configuration further enhances power supply stability during the transportation process. Additionally, there is no need for manual opening of the container for jumper configuration, preserving the trans- portation environment for the cryogenic superconducting magnet. Consequently, transportation costs are further reduced, and transportation efficiency is improved.

Figure 2:
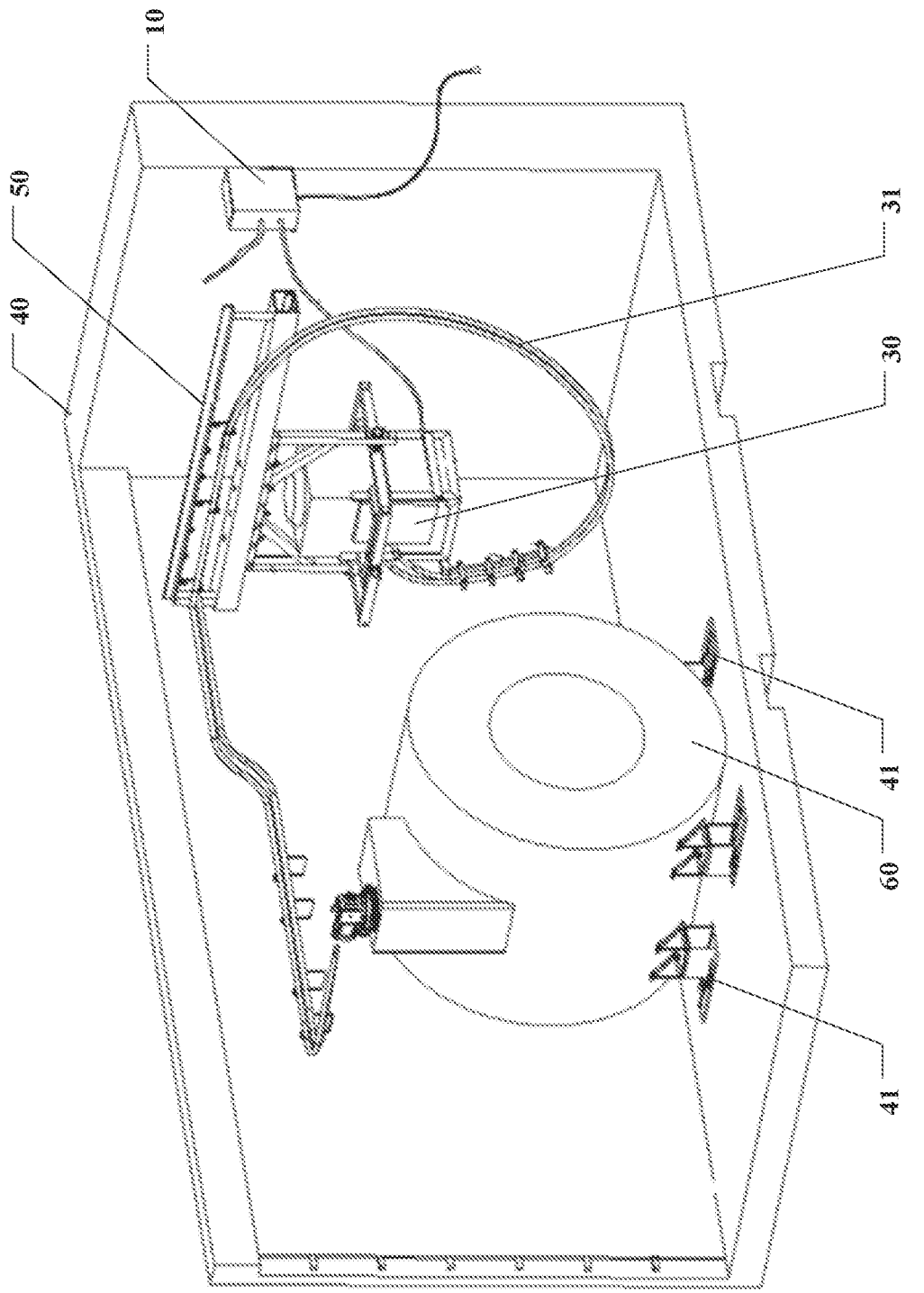
FIG. 2 is a structural schematic diagram of a device for transporting a superconducting magnet according to an embodiment of the present disclosure.

The electrical control box 10 for superconducting magnet transportation provided according to the above embodi- ments, is primarily from the perspective of stable power supply to improve the conventional apparatus for transport- ing the superconducting magnet to ensure the smooth trans- portation of cryogenic superconducting magnet. As described above, in the transportation process of the cryo- genic superconducting magnet, two conditions are further required. One condition is to ensure a temperature and humidity environment of the refrigerator 20 to operate reliably. The other condition is to ensure that the helium compressor 30 remains in a consistently horizontal position or approaches it at all times. Based on this, an embodiment of a device for transporting a superconducting magnet is provided, as shown in FIG. 2. The device for transporting the superconducting magnet includes: the electrical control box 10 for superconducting magnet transportation in the above embodiments, a container with a thermal insulation layer 40, a refrigerator 20, a helium compressor 30, and a suspension structure 50.

The electrical control box 10 for superconducting magnet transportation is arranged on an inner sidewall of the con- tainer 40 and connected to the helium compressor 30, the refrigerator 20 and the external power supply through power cables. The refrigerator 20 is arranged in the container 40 to adjust temperature in the container 40. The suspension structure 50 is secured on the top of the inner wall of the container 40.

The helium compressor 30 is kept suspended in the container 40 by the suspension structure 50.

The helium compressor 30 is connected to the supercon- ducting magnet 60 through a helium tube 31 to provide liquid helium to ensure the superconducting state of the internal coils of the superconducting magnet 60. In general, the helium tube 31 and the helium compressor 30 are connected and secured through threaded screw connection to prevent liquid helium leakage. After being inserted into the compressor interface, the helium tube connector is tightened and secured to the helium compressor 30 through the helium tube nut 32. The helium tube connector is a stainless steel hard tube 311 and the connected part is a metal corrugated flexible tube 312 for the bending of helium tube 31 to adapt to the possible bumps in the transportation process. The stainless steel hard tube 311 and the metal corrugated flexible tube 312 are components of the helium tube 31.

The electrical control box 10 is also configured to ensure a stable power supply for the refrigerator 20 and the helium compressor 30. The container 40 with the thermal insulation layer is configured to isolate the superconducting magnet 60 from external environment to ensure that temperature in the container 40 is not affected by the external factors or minimize the impact. The refrigerator 20 is configured to cool the environment in the container 40 to ensure that the liquid helium is non-volatile. The suspension structure 50 is configured to keep the helium compressor 30 always approaching or being a horizontal state during the transportation process. During the operation of the helium compressor 30 of the superconducting magnet, in a case that the helium compressor 30 follows the hull and tilts beyond five degrees, there is a risk of lubricating oil inside of the compressor overflowing and mixing with refrigerant gas. The oil may then follow the refrigerant gas into the refrigerator of the superconducting magnet, causing irreversible damage on the refrigerator and compromising the refrigerating effect. Therefore, maintaining the helium compressor 30 in a horizontal or approaching-horizontal state via the suspension structure 50 is also an essential condition for the transportation process of the superconducting magnet 60.

The above device for transporting the superconducting magnet is set up corresponding to the three essential conditions for the transportation of superconducting magnet 60 to meet such requirements. The electrical control box 10 is configured, as described in the above embodiment, to meet the essential condition of the smooth power supply. The specific principle and implementation have been described in the part of the above embodiments of the electrical control box 10, which will not be repeated herein. The container 40 with the thermal insulation layer is configured for a stable transport environment. Where, the container body isolates the internal container from the external environment. Further, the refrigerator 20 is configured to implement the cooling of the environment inside the container 40 to meet temperature requirement of liquid helium. The suspension structure 50 is secured on the top of the container body, so that the helium compressor 30 is suspended from the ground of the container body. In this way, the helium compressor 30 can remain in a horizontal position even when the container body experiences shaking or vibrations.

Figure 3:
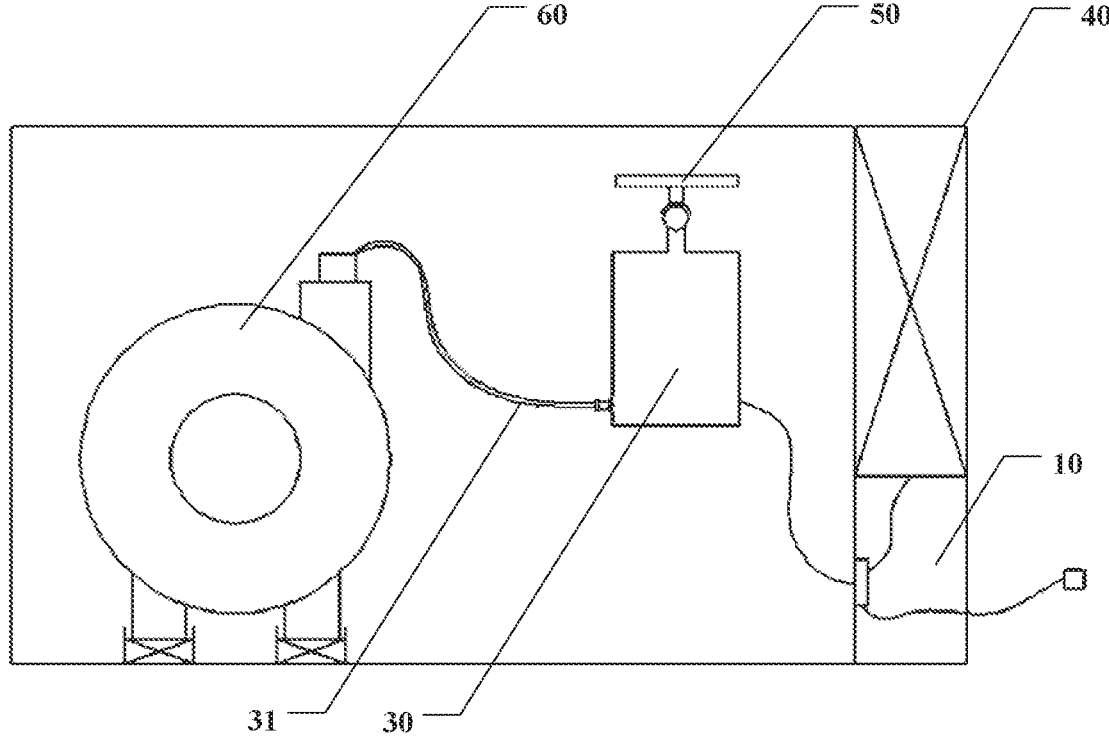
FIG. 3 is a structural schematic diagram of a suspension structure in conventional technology.

For the suspension structure 50, there are many conventional implementations. A more common one is as shown in FIG. 3. A movable structure is provided between a secured part of the suspension structure 50 with the top of the container body and a part of the suspension structure 50 configured to secure the helium compressor 30, such as a hinged structure or a rotating structure, so that the helium compressor 30 can remain in a horizontal position by gravity when the container body experiences shaking or vibrations.

Figure 4:
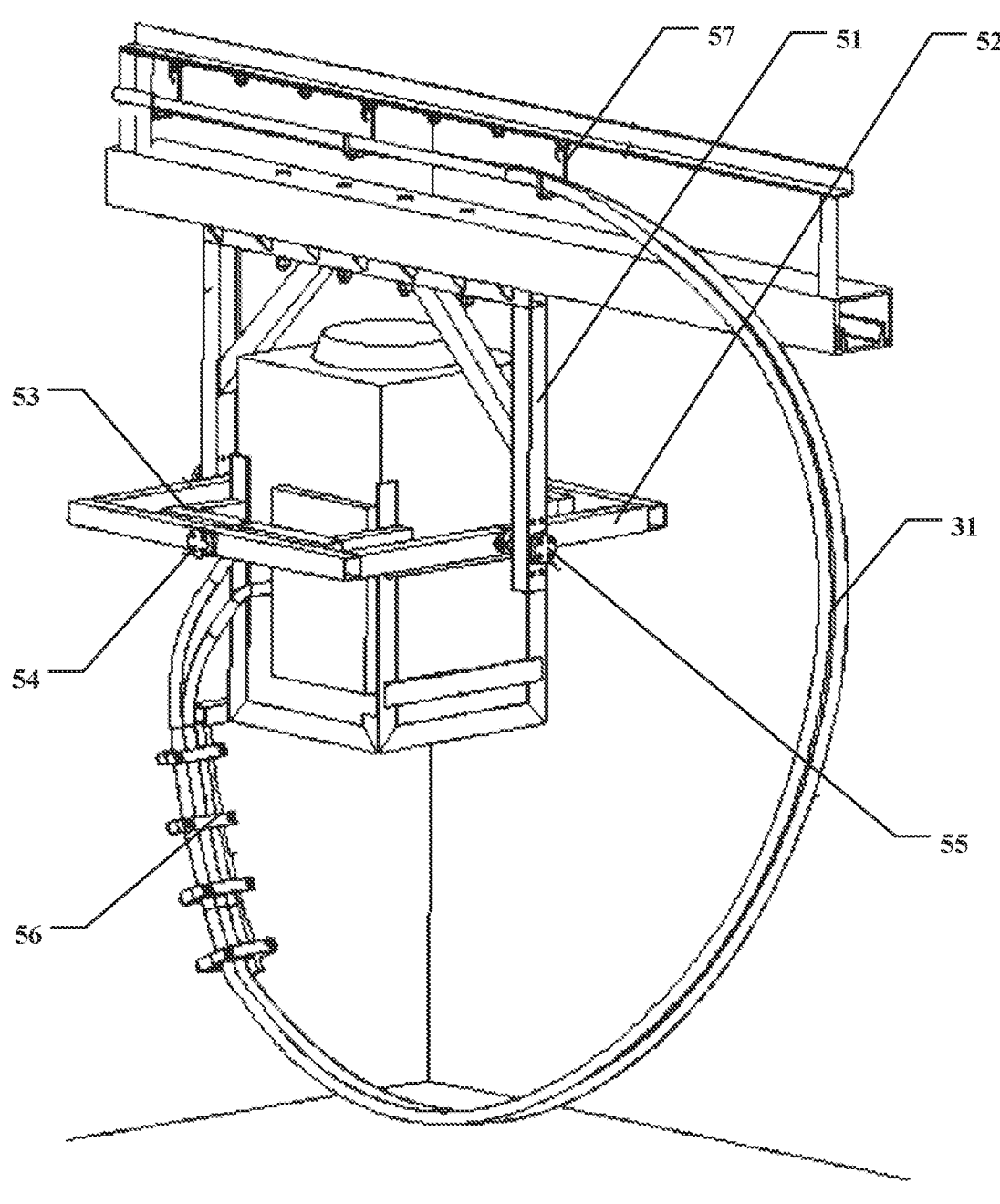
FIG. 4 is a structural schematic diagram of a suspension structure according to an embodiment of the present disclosure.

However, the effectiveness of above simple suspension structure 50 in maintaining the helium compressor 30 in the approaching-horizontal state is far from satisfactory. According to an embodiment, a possible implementation is provided as shown in FIG. 4. Where, a suspension structure 50 includes a fixing frame 51, an outer frame 52 and an inner frame 53.

The fixing frame 51 is secured on the top of the inner wall of the container 40, and the outer frame 52 is hinged under the fixing frame 51, and the inner frame 53 is hinged on the outer frame 52 for installing the helium compressor 30. A rotating axis 54 of the inner frame 53 intersects with a rotating axis 55 of the outer frame 52, and the two rotating axes are located on the same horizontal plane as the center of gravity of the helium compressor 30.

It should be noted that, in practice, a good horizontal stability effect can also be achieved by positioning the intersection point of the rotational axes of the two rotating frames slightly above the center of the helium compressor 30 along the vertical axis. Having said that, having both rotational axes and the center of gravity of the helium compressor 30 on the same horizontal plane is considered an ideal implementation.

The suspension structure 50 provided according to this embodiment implements a basic self-balancing function. The specific self-balancing process is as follows. In a case that the hull is horizontal, the helium compressor 30, the inner and outer frames of the helium compressor 30 remains horizontal. In a case that the ship tilts forward or backward at an angle α, under the gravity of helium compressor 30, the front and back rotating shaft between the outer frame 52 and the fixing frame 51 rotates in an opposite direction by the angle α. Consequently, the helium compressor 30 and the inner and outer frames remain horizontal as a whole. In a case that the hull tilts left or right at an angle β, under the gravity of the helium compressor 30, the left and right rotating shaft between the inner frame 53 and the outer frame 52 rotates in an opposite direction by the angle β. Hence, the helium compressor 30 and the inner frame 53 remain horizontal as a whole. In a case that the hull tilts left or right at an angle as well as forward or backward at an angle, the two rotating shafts act simultaneously and rotate in the opposite directions by corresponding angles, to remain the helium compressor 30 always in a horizontal state.

Through a structural configuration of intersected internal and external rotating frames, the helium compressor 30 swings at any angle on the suspension structure 50 by gravity. The rotation axes of the inner and outer frames are located at the same horizontal plane as the center of gravity of the helium compressor 30, a distance between the helium compressor 30 and the rotation center is extremely short, even zero. Impact moment of inertia generated by the weight and the acceleration of the helium compressor 30 become extremely small, which can reduce the sway caused by the impact, so that the suspension structure 50 provided in this embodiment can still achieve the effect of smoothly and automatically maintaining the compressor horizontal regardless of the hull or vehicle body tilting at any angle to front, back, left or right directions.

Given that the superconducting magnet is usually secured at the bottom of container 40, and the helium compressor 30 remain in an approaching or being a horizontal state via the suspension structure 50, a relative position between the helium compressor 30 and the superconducting magnet may change when the container 40 experiences bumps. The helium tube 31, which serves as a bridge for transporting liquid helium between the helium compressor 30 and the superconducting magnet, needs to have a certain degree of flexibility. However, if the helium tube 31 could move freely within the container 40, it would also compromise the transportation of the superconducting magnet. Therefore, apart from retaining the necessary flexible parts of the helium tube 31 for movement, other parts of the helium tube 31 may be secured using fixing devices. For example, the connection path of the helium tube 31 between the helium compressor 30 and the superconducting magnet is arranged and secured through the fixing device secured on the surface of container 40. While a part of the helium tube 31 is retained to move freely at a location close to the helium compressor 30, to adapt to the self-balancing motion of the helium compressor 30 when container 40 experiences bumps.

Figure 5:
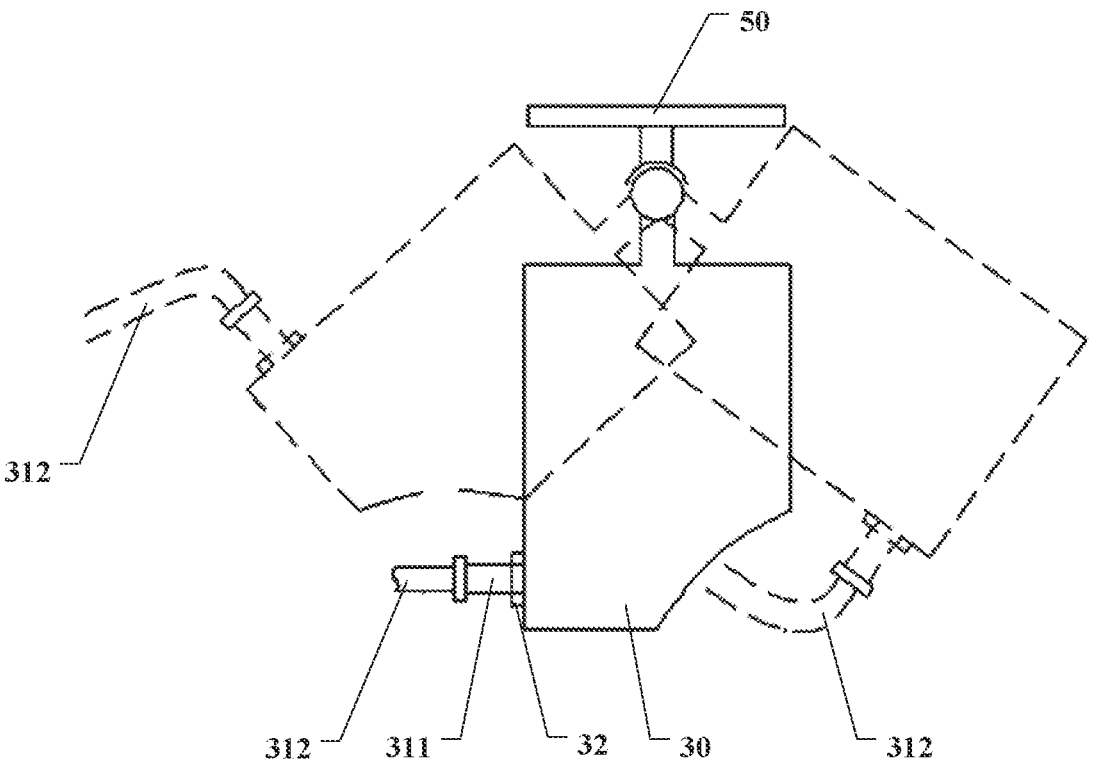
FIG. 5 is a schematic diagram of a scenario where a suspension structure is provided and a helium compressor is swinging.

In conventional structure, the helium tube 31 is connected to the compressor through a rigid stainless steel hard tube 311, the rest part is a metal corrugated flexible tube 312. When the helium compressor 30 swings, the connection part between the corrugated flexible tube 312 and stainless steel hard tube 311 is most prone to bend and deform. When a bending radius is small and may exceed an elastic deformation range of the corrugated flexible tube and causes plastic irreversible material stretching, as shown in FIG. 5 (a part of the FIG. 5 in a solid line is the helium compressor 30 in a stable state, and a part of FIG. 5 in a dashed line is the helium compressor 30 in a swinging state). After repeated bidirectional bending for multiple times, the bending area of the metal flexible tube is extended excessively, resulting in metal fracture, causing refrigerant leakage in the helium tube 31. As a result, the helium compressor 30 loses its refrigeration function. In addition, when the helium compressor swings, a helium tube nut 32 is more likely to loosen over time, causing the refrigerant leakage in the helium tube 31 as well. This, in turn, leads to the helium compressor 30 losing its refrigeration function.

In order to solve the above problems, an preferred implementation is provided according to an embodiment, the suspension structure 50 described above further includes: a curved outlet plate 56 arranged at the interface of the helium tube of the helium compressor 30.

An end of the curved outlet plate 56 is secured on the inner frame 53, which is configured to secure the helium tube 31 drawn from the helium compressor 30.

As described above, the connection part between the helium tube 31 and the helium compressor 30 is usually the rigid stainless steel hard tube 311, and the rest part is the metal corrugated flexible tube 312. Therefore, in this embodiment, the connection part between the stainless steel hard tube 311 and metal corrugated flexible tube 312 is secured through the curved outlet plate 56, to eliminate problems such as material breakage of the connection part due to the vibration of the helium compressor 30. In this case, a length of the curved outlet plate must cover a part of the stainless steel hard tube 311 and a part of the connected metal corrugated flexible tube 312 of the helium tube 31. Regarding the arc of the curved outlet plate, an excessive arc is prone to exceed the elastic deformation range of metal corrugated flexible tube 312, resulting in breakage. On the other hand, an arc that is too small is not beneficial for the path arrangement of the helium tube 31. Due to the limited space in the container 40, the arc cannot be too small. Usually, a circular arc corresponding to the curved outlet plate with a radius of 300 mm to 500 mm is preferable.

Further, the curved outlet plate may be a hard plate with an arc. The helium tube 31 is fixedly connected to the curved outlet plate through a fastener. The fastener may be a clamping block with a slot, which securely holds the helium tube 31 in place on the curved outlet plate through the slot. Alternatively, the curved outlet plate itself may provide with a fixing structure, such as a hollow slot in the middle of the curved outlet plate for accommodating the helium tube 31, etc. This embodiment does not limit the method of securing the helium tube 31 to the curved outlet plate.

Since the curved outlet plate has an arc, the connection part between the helium tube 31 and the helium compressor

30 does not bend beyond the elastic limit when the helium compressor 30 swings, which can effectively eliminate the problem of refrigerant leakage in the helium tube 31 caused by swing. As for the metal flexible tube drawn from the other end of the curved outlet plate, since the part most prone to excessive bending is protected by the curved outlet plate, the remaining of the flexible tube may form a smooth circular arc route based on the path arrangement of the helium tube 3, as shown in FIGS. 2 and 3, and extend upwards to the fixing frame 51 to be connect to the superconducting magnet. When the helium compressor 30 swings in the left, right, forward, or backward directions, the circular arc overhanging portion of the helium tube 31 evenly distributes the bending angle and torsion angle. The bending stress on a unit section is within the elastic range of the metal corrugated flexible tube 312 of the helium tube, allowing it to endure long transportation periods without damage.

Similarly, for path arrangements as shown FIG. 2 and FIG. 3, in order to implement a smooth circular arc route of the flexible tube, the helium tube 31 is required to be connected to the superconducting magnet along the fixing frame 51 secured on the top of the container 40. In this case, the corresponding fixing frame 51 may secure the helium tube 31 by an external fastener or a built-in fixing structure. Given that excessive bending angle on local flexible tube may also occur if a rigid fixing mode is used (such as a hollow slot is arranged in the middle of the fixing frame 51), an implementation is provided according to an embodiment, as shown in FIG. 3. The suspension structure 50 further includes a flexible hook 57 arranged at the fixing frame 51, the flexible hook 57 is configured to hang the helium tube 31.

The quantity of the flexible hook 57 is determined based on the length of the helium tube 31 that is required to be secured, which is not limited in this embodiment. The flexible hook 57 may swing freely on the fixing frame 51, so that the movement of the helium tube 31 at the fixing frame 51 is not limited, reducing the influence of bending of the helium tube 31, thereby preventing the refrigerant leakage.

Further, in order to protect flexible tube section of the helium tube 31 from excessive bending angles, a preferable implementation is provided according to an embodiment for other flexible tube parts without fixing protection (i.e., without an curved outlet plate or a fastener), which includes a drag chain arranged on an outer surface of the helium tube 31.

The drag chain, as a device for binding cables, wires, or pneumatic and hydraulic tubes to facilitate their rotation and movement, can effectively prevent excessive bending angles in local areas of flexible tube. This, in turn, provides further protection to the helium tube 31 and enhances the reliability during the transportation of the superconducting magnet.

Furthermore, in addition to protecting the transportation of the cryogenic superconducting magnet by keeping the helium compressor 30 approaching or being a horizontal state via the suspension structure 50, another preferable implementation is provided according to an embodiment, to reduce the adverse effects on the cryogenic superconducting magnet transportation due to bumps, as shown in FIG. 2. The device for transporting a superconducting magnet described above further includes: a cushioning and shock-absorbing structure 41 arranged between a bottom plate of container 40 and the superconducting magnet 60.

The specific implementation forms of the cushioning and shock-absorbing structure 41 are not limited in this embodiment. The cushioning and shock-absorbing structure 41 may be implemented by means of a spring structure, elastic material or flexible material, etc. The objective of cushioning and shock-absorbing structure 41 is to reduce bumps and impacts of container 40 during transportation process, thereby improving the stability of the superconducting magnet 60 transportation. As shown in FIG. 2, in conventional technology, the superconducting magnet is usually secured in container 40 through fixing slots or columns (a solution provided with four corners fixed is shown in FIG. 2, where one corner of which is blocked and not shown) during the transportation process of the superconducting magnet. Therefore, for the application scenario shown in FIG. 2, the above cushioning and shock-absorbing structure 41 may be arranged at four fixing slots. The fixing slot is provided with a rubber buffer pad and other structures as the cushioning and shock-absorbing structure 41.

In the conventional transportation process of the superconducting magnet, in order to ensure the stability of the environment inside the container 40, the container 40 cannot be opened at will. Therefore, in order to determine the situation of the superconducting magnet 60 inside the container 40, it is preferred to arrange a superconducting magnet state monitor in the container 40 for collecting and saving the operating state data of the superconducting magnet and the helium compressor 30, or sending to an upper computer to inform the relevant personnel.

Correspondingly, for normal operation of superconducting magnet state monitor, the electrical control box 10 may supply power. Alternatively, battery provided in the monitor may be used as a power supply. In a case that the electrical control box 10 is configured to supply power, the electrical control box 10 should be arranged with one more power output and outlet. When the external power supply input is divided through the power supply distribution module 11, one more power supply should be divided. Whether add a delay module 12, a phase sequence conversion module 13, a phase sequence detection module 14, a voltage gear switching module 15 and a voltage detection module 16 and the like is determined according to the actual requirement. Given that the transportation process of the superconducting magnet 60 is a process for a long period, it is preferred to use the electrical control box 10 to supply power to the superconducting magnet monitor.

Similarly, to implement communication between the superconducting magnet monitor and external data, a communication module should also be arranged. Since the wireless communication signal is more likely to be interfered during long-distance transportation, the communication module may be implemented by a satellite communication module to facilitate relevant personnel at a remote headquarter to view and monitor the superconducting magnet state in the container 40 during the transportation process at any time. In this case, an external device is a main console, computers and the like located at the remote headquarter. Similarly, in order to meet the signal transmission requirements of the satellite communication module, the satellite communication module should be located outside container 40 and be connected to the superconducting magnet monitor inside the container 40 by cable through an opening suitable in size and shape (to further ensure the sealing performance of the container 40, a sealing member may be set at the opening hole). Data communication between the satellite communication module and the superconducting magnet monitor can be implemented, which is powered by a superconducting magnet monitor.

It should also be noted that the communications between the superconducting magnet monitor and the external device implemented by the communication module may be bidirectional communications. In this case, the monitor transmits state data to the external device. While the external device issues control instructions to the container 40. The control instructions may be to control the temperature adjustment of the refrigerator 20, to control the operating state of the helium compressor 30, and may be control the delay period of the delay module 12, which is not limited in this embodiment.

With the device for transporting a superconducting magnet provided according to this embodiment, by isolating the external environment through the container 40 with a sealed layer, a stable transportation environment is provided for the superconducting magnet. By cooling the internal environment of the container body through the refrigerator 20, the temperature requirements for the liquid helium refrigerating superconducting magnet are achieved. Further, the electrical control box 10 in the above embodiment is configured to implement stable and reliable power supply for the devices in the container 40, which meets another essential condition in the transportation process of the cryogenic superconducting magnet. The essential condition of keeping the helium compressor 30 always approaching or being a horizontal state is achieved by the suspension structure 50 with the inner and outer double rotating frames, the stability of the center of gravity of the helium compressor 30 is ensured to the maximum extent to prevent the oil and gas form mixing together due to bumps in transportation. In addition, other improvements are made according to this embodiment, the connection part between the helium tube 31 and the helium compressor 30 is secured through a curved outlet 56 to prevent breakage of helium tube 31 due to excessive bending. The path configuration of the helium tube 31 is implemented by the flexible hook arranged at the fixing frame 51, and the possibility of excessive deformation of helium tube 31 is further reduced. The helium tube 31 is protected from excessive deformation by a drag chain arranged on outside of the helium tube 31. The impact of bumps on container 40 during the transportation process is further reduced through the cushioning and shock-absorbing structure between container 40 and the vehicle. The operating state of the superconducting magnet and helium compressor 30 in container 40 is acquired though the superconducting magnet state monitor. As a result, the state monitoring can be implemented without opening the container 40, which otherwise would damage the environment in the container. The device for transporting a superconducting magnet provided in this embodiment can effectively ensure the various essential conditions in the transportation process of the cryogenic superconducting magnet and can be used repeatedly. No special requirement of the transport vehicle is required, the conventional cold chain transportation system and tools can be used. No special logistics control is required for the device for transporting the superconducting magnet, which has low management and transportation cost and can better adapt to the transportation requirements of the cryogenic superconducting magnet.

The electrical control box for superconducting magnet transportation and the device for transporting a superconducting magnet provided in the present disclosure are described in detail. The embodiments in the specification are described in a progressive manner. Each of the embodiments mainly focuses on differences from other embodiments, and references may be made to each other for the same or similar parts among the embodiments. Since the device disclosed in the embodiment corresponds to the method disclosed in the embodiment, the description for the device is simple, and reference may be made to the method in the embodiment for the relevant parts. It should be noted that, for those ordinary skilled in the art, various modifications and improvements may be made to the present disclosure without departing from the principle of the present disclosure, and these modifications and improvements also fall within the protection scope of the claims of the present disclosure.

It should be further noted that the relational terms such as "first" and "second" are only used herein to distinguish one entity or operation from another entity or operation, rather than to necessitate or imply that the actual relationship or order exists between the entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a(n) . . . " does not exclude existence of another identical element in such process, method, article or device.

The invention claimed is:

1. An electrical control box for superconducting magnet transportation, comprising: at least three power supply outlets, a power supply distribution module, and a delay module, wherein among the at least three power supply outlets, a first power supply outlet is configured to be connected to an external power supply, a second power supply outlet is configured to be connected to a refrigerator, and a third power supply outlet is configured to be connected to a helium compressor;

the power supply distribution module is connected to the first power supply outlet, the second power supply outlet and the third power supply outlet respectively, and configured to divide electric energy inputted from the first power supply outlet into two branches to supply to the second power supply outlet and the third power supply outlet; and the delay module is arranged between the power supply distribution module and the third power supply outlet, and the delay module is configured to delay powering on the third power supply outlet.

2. The electrical control box for superconducting magnet transportation according to claim 1, further comprising: a phase sequence conversion module and a phase sequence detection module, wherein the phase sequence conversion module is connected to the power supply distribution module and the delay module, wherein the phase sequence conversion module comprises two alternating current contactors, the two alternating current contactors are connected to the delay module in a sequential connection and in a changed phase sequence connection respectively, the two alternating current contactors are connected to the phase sequence detection module, and turn-on state and turn-off state of the two alternating current contactors are controlled by the phase sequence detection module; and the phase sequence detection module is connected to the power supply distribution module, and the phase sequence detection module is configured to detect a phase sequence of power supply outputted by the power supply distribution module and control the two alternating current contactors in the phase sequence conversion module to be turned on or off, based on the phase sequence of power supply.

3. The electrical control box for superconducting magnet transportation according to claim 1, further comprising:

a voltage gear switching module; and a voltage detection module, wherein the voltage gear switching module is arranged between the power supply distribution module and the helium compressor, the voltage gear switching module comprises a plurality sets of jumpers and a selection device; wherein each of the plurality sets of jumpers is connected to the helium compressor and the power supply distribution module respectively, corresponding to different voltage levels, and the selection device is configured to control each of the plurality sets of jumpers to be turned on or off, and the voltage detection module is connected to the power supply distribution module and the selection device, and the voltage detection module is configured to detect an output voltage of the power supply distribution module and return a result to the selection device.

4. A device for transporting a superconducting magnet, comprising an electrical control box for superconducting magnet transportation, a container with a thermal insulation layer, a refrigerator, a helium compressor, and a suspension structure, wherein the electrical control box for superconducting magnet transportation is arranged on an inner sidewall of the container and connected to the helium compressor, the refrigerator and the external power supply through power cables respectively; wherein the electrical control box for superconducting magnet transportation comprises: at least three power supply outlets, a power supply distribution module, and a delay module, wherein among the at least three power supply outlets, a first power supply outlet is configured to be connected to an external power supply, a second power supply outlet is configured to be connected to a refrigerator, and a third power supply outlet is configured to be connected to a helium compressor; the power supply distribution module is connected to the first power supply outlet, the second power supply outlet and the third power supply outlet respectively, and configured to divide electric energy inputted from the first power supply outlet into two branches to supply to the second power supply outlet and the third power supply outlet; and the delay module is arranged between the power supply distribution module and the third power supply outlet, and the delay module is configured to delay powering on the third power supply outlet;

the refrigerator is arranged in the container, the refrigerator is configured to adjust temperature in the container;

the suspension structure is secured on top of an inner wall of the container; and the helium compressor is kept suspended in the container by the suspension structure.

5. The device for transporting the superconducting magnet according to claim 4, wherein the suspension structure comprises a fixing frame, an outer frame and an inner frame, wherein the fixing frame is secured on the top of the inner wall of the container, the outer frame is hinged under the fixing frame, the inner frame is hinged on the outer frame for installing the helium compressor, a rotating axis of the inner frame intersects with a rotating axis of the outer frame, and the two rotating axes are located on a same horizontal plane as a center of gravity of the helium compressor.

6. The device for transporting the superconducting magnet according to claim 5, wherein the suspension structure further comprises: a curved outlet plate arranged at a helium tube interface of the helium compressor, wherein an end of the curved outlet plate is secured on the inner frame, and the curved outlet plate is configured to secure the helium tube drawn from the helium compressor.

7. The device for transporting the superconducting magnet according to claim 6, wherein the suspension structure further comprises: a flexible hook arranged at the fixing frame, and the flexible hook is configured to hang the helium tube.

8. The device for transporting the superconducting magnet according to claim 7, further comprising: a drag chain arranged on an outer surface of the helium tube.

9. The device for transporting the superconducting magnet according to claim 4, further comprising: a cushioning and shock-absorbing structure arranged between a bottom plate of the container and the superconducting magnet.

10. The device for transporting the superconducting magnet according to claim 4, further comprising: a superconducting magnet state monitor arranged at the superconducting magnet, wherein correspondingly, the electrical control box for the superconducting magnet transportation further comprises a power supply outlet configured to be connected to the superconducting magnet state monitor; and a communication module is further arranged outside the container, and the communication module is configured to communicate between the superconducting magnet state monitor and an external device, and the communication module is connected to the superconducting magnet state monitor through a cable.

11. The device for transporting the superconducting magnet according to claim 4, wherein the electrical control box for superconducting magnet transportation further comprises: a phase sequence conversion module and a phase sequence detection module, wherein the phase sequence conversion module is connected to the power supply distribution module and the delay module, wherein the phase sequence conversion module comprises two alternating current contactors, the two alternating current contactors are connected to the delay module in a sequential connection and in a changed phase sequence connection respectively, the two alternating current contactors are connected to the phase sequence detection module, and turn-on state and turn-off state of the two alternating current contactors are controlled by the phase sequence detection module; and the phase sequence detection module is connected to the power supply distribution module, and the phase sequence detection module is configured to detect a phase sequence of power supply outputted by the power supply distribution module and control the two alternating current contactors in the phase sequence conversion module to be turned on or off, based on the phase sequence of power supply.

12. The device for transporting the superconducting magnet according to claim 4, wherein the electrical control box for superconducting magnet transportation further comprises:

a voltage gear switching module; and a voltage detection module, wherein the voltage gear switching module is arranged between the power supply distribution module and the helium compressor, the voltage gear switching module comprises a plurality sets of jumpers and a selection device; wherein each of the plurality sets of jumpers is connected to the helium compressor and the power supply distribution module respectively, corresponding to different voltage levels, and the selection device is configured to control each of the plurality sets of jumpers to be turned on or off; and the voltage detection module is connected to the power supply distribution module and the selection device, and the voltage detection module is configured to detect an output voltage of the power supply distribution module and return a result to the selection device.

\* \* \* \* \*